US007395064B2

(12) United States Patent
Demirhan et al.

(10) Patent No.: US 7,395,064 B2
(45) Date of Patent: Jul. 1, 2008

(54) SYSTEMS AND METHODS OF DISTRIBUTED SELF-CONFIGURATION FOR WIRELESS NETWORKS

(75) Inventors: Mustafa Demirhan, Hillsboro, OR (US); Mousumi Hazra, Beaverton, OR (US); Nandakishore Kushalnagar, Portland, OR (US); Mark Yarvis, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 40 days.

(21) Appl. No.: 10/890,950

(22) Filed: Jul. 14, 2004

(65) Prior Publication Data

US 2006/0014536 A1 Jan. 19, 2006

(51) Int. Cl.
H04Q 7/20 (2006.01)
H04B 7/00 (2006.01)
(52) U.S. Cl. .................. 455/434; 455/464; 455/513
(58) Field of Classification Search ................ 455/434, 455/435.1, 436, 456.2, 464, 509, 512, 513
See application file for complete search history.

(56) References Cited

U.S. PATENT DOCUMENTS 6,977,978 B1  12/2005  Jakobsson
2002/0181417 A1*  12/2002  Malhotra et al. ............ 370/329
2002/0188723 A1*  12/2002  Choi et al. .................. 709/225
2002/0191611 A1  12/2002  Benayoun et al.
2003/0179727 A1*  9/2003  Soong et al. ................ 370/328
2003/0219030 A1*  11/2003  Gubbi ........................ 370/442
2004/0090943 A1  5/2004  Da Costa et al.
2005/0055417 A1*  3/2005  Reich et al. ................. 709/208
2005/0128988 A1*  6/2005  Simpson et al. ............ 370/338

FOREIGN PATENT DOCUMENTS

| TW | 0379508 | 1/2000 |
| TW | 0548995 | 8/2003 |
| TW | 0223201 | 11/2004 |
| TW | 0243573 | 11/2005 |
| WO | WO-0390424 A1 | 10/2003 |
| WO | WO-2004/032536 A2 | 4/2004 |

OTHER PUBLICATIONS

"International Search Report for corresponding PCT Application No. PCT/US2005/024275", (Oct. 25, 2005), 3 pgs.

* cited by examiner

Primary Examiner—Duc M. Nguyen
Assistant Examiner—Michael Thier
(74) Attorney, Agent, or Firm—Schwegman, Lundberg & Woessner, P.A.

(57) ABSTRACT

An embodiment selects one or more radio frequency parameters that may be optimal for a wireless network of access points and clients. Various methods, systems, and/or computer-readable media may implement operational embodiments.

24 Claims, 8 Drawing Sheets

US 7,395,064 B2

SYSTEMS AND METHODS OF DISTRIBUTED SELF-CONFIGURATION FOR WIRELESS NETWORKS

TECHNICAL FIELD

Exemplary embodiments relate to wireless networks and, in particular, to a distributed operation for automatically configuring parameters in a wireless ESS (Extended Service Set) mesh network.

BACKGROUND

Today the volume of 802.11 products is on the rise, thus making it challenging to control the escalation of radio frequency interference. Even in enterprise environments, with IT (Information Technology) support staff, configuration of 802.11 RF (Radio Frequency) parameters to minimize interference requires a huge amount of work. In addition, while the configuration may be initially optimal, when the environment changes (e.g., a neighboring office installs a new wireless network) the configuration may require adjustment. In an ESS mesh network, identification of an optimal configuration is challenging, since the selected configuration will not necessarily be optimal for each AP (Access Point) and will instead be optimal for the network as a whole.

A current method for RF configuration is a manual method where a site survey is performed at the time of network deployment. However, this solution does not adapt to changes in the environment.

In known centralized methods APs report to a single predefined central device, which makes all configuration decisions. Centralized solutions require each network to include a specialized node, introducing a single point of failure. In addition, a centralized approach requires nodes to constantly report their status to the controlling node, introducing additional management overhead.

Therefore, there is a need in the art for an improved operation for configuring an ESS mesh network.

BRIEF DESCRIPTION OF THE DRAWINGS

The accompanying figures, in which like reference numerals refer to identical or functionally similar elements throughout the separate views and which are incorporated in and form part of the specification, further illustrate exemplary embodiments.

DETAILED DESCRIPTION

In the following detailed description of the various embodiments, reference is made to the accompanying drawings that form a part hereof, and in which are shown by way of illustration specific embodiments. These embodiments are described in sufficient detail for those skilled in the art, and it is to be understood that other embodiments may be utilized and that changes may be made without departing from the scope of the operational principles of the various embodiments. The following detailed description is, therefore, not to be taken in a limiting sense, and the scope is defined only by the appended claims.

Figure 1:
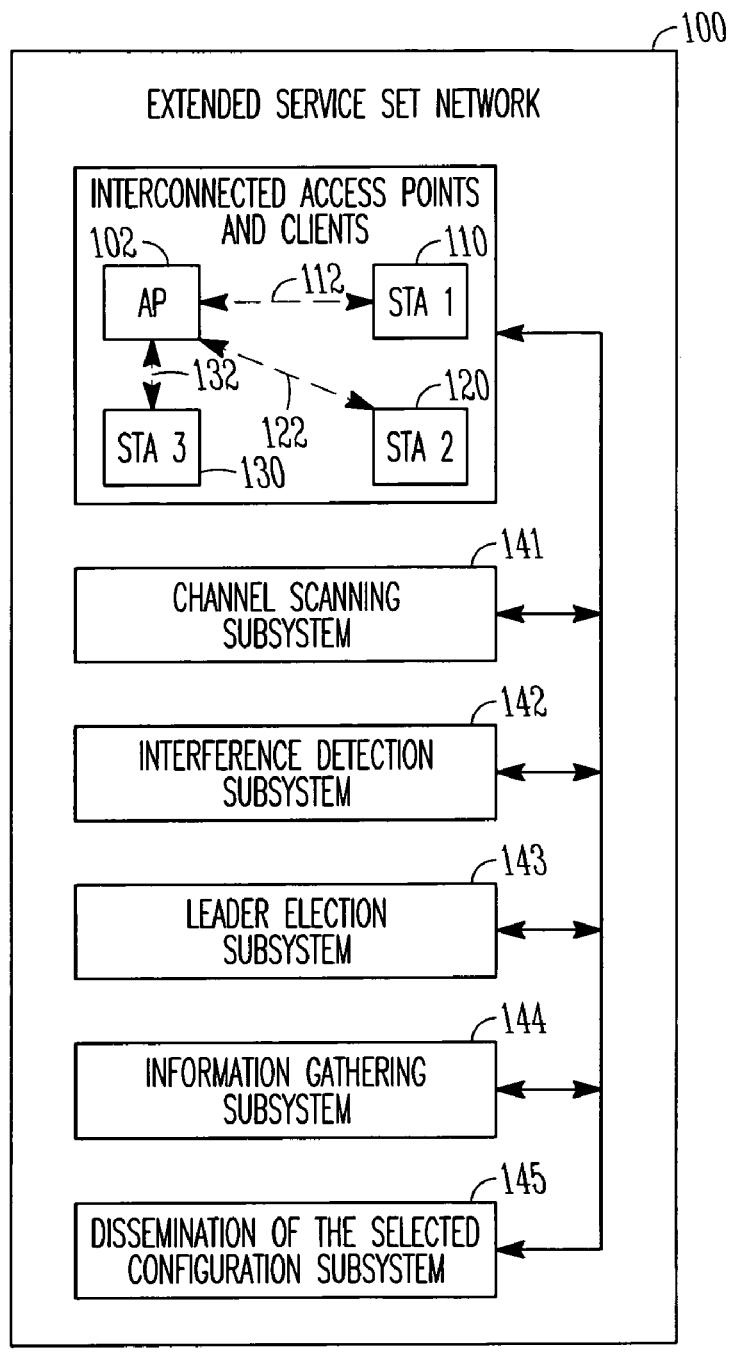
FIG. 1 shows a diagram of a wireless network.

FIG. 1 shows a diagram of a wireless network. Wireless network 100 includes access point (AP) 102 and clients, such as mobile stations (STA) 110, 120, and 130. In some embodiments, wireless network 100 is a wireless local area network (WLAN). For example, one or more of mobile stations 110, 120, and 130, or access point 102 may operate in compliance with a wireless network standard such as ANSI/IEEE (American National Standards Institute/Institution of Electrical and Electronic Engineers) Std. 802.11, 1999 Edition, although this is not a limitation of the present embodiments. As used herein, the term "802.11" refers to any past, present, or future IEEE 802.11 standard, including, but not limited to, the 1999 edition.

Mobile stations 110, 120, and 130 maybe any type of mobile station capable of communicating in network 100. For example, the mobile stations may be computers, personal digital assistants, wireless-capable cellular phones, or the like. As explained below, in some embodiments, mobile stations 110, 120, and 130 operate in compliance with an 802.11 standard, and are also capable of scanning channels to detect interference. The channel scanning may occur simultaneously with channel scanning performed by access point 102, or may be performed at periodic intervals whether or not access point 102 performs channel scanning.

Access point 102 communicates with mobile station 110 (also referred to as "STA1") using signal 112. Access point 102 communicates with mobile station 120 (also referred to as "STA2") using signal 122, and access point 102 communicates with mobile station 130 (also referred to as "STA3") using signal 132. In some embodiments, signals 112, 122, and 132 utilize one out of many possible "channels." For example, wireless network 100 may operate in a single channel, and signals 112, 122, and 132 are all signals in the single channel. This single channel is referred to herein as the "channel in use" by wireless network 100. The channel in use by network 100 may be subject to interference by other wireless networks or other RF (Radio Frequency) emitters. Other channels available to wireless network 100 may also be subject to interference. In some embodiments, wireless network 100 may change the channel in use to any channel available to network 100.

A communications medium may include any number of channels, and the channels may be defined in many different ways. As used herein, the term "channel" refers to any subset of a communication medium that may be used for a communication in a wireless network. For example, in some frequency division multiplexing embodiments, channels may be defined by a frequency band. Also for example, in some spread spectrum embodiments, channels may be defined by codes used to specify the spreading of the signal. In still further embodiments, channels may be defined using a combination of spatial information and other information, such as in systems that utilize spatial division multiple access (SDMA) or multiple-input-multiple-output (MIMO) communications. Channels may be defined in any manner and be still useable with the exemplary embodiments.

Wireless networks may use any available channel. Other wireless networks or RF emitters may also use one or more channels available to wireless network 100, resulting in interference. In various embodiments, access points and mobile stations perform channel "scans" to detect potential interference. As used herein the term "scan" refers to an act of monitoring one or more channels to detect potentially interfering signals. In some embodiments, channel scanning is performed by both an access point and one or more mobile stations in a coordinated fashion. For example, an access point may scan one channel, while a mobile station simultaneously scans a different channel.

Channels are scanned periodically, and one or more tables of channel interference, or "scan tables," are maintained to track which channels are subject to interference. For example, in some embodiments, each device in the network (e.g., access points and mobile stations) may maintain a single scan table, and an access point may obtain scan tables or parts thereof from mobile stations.

An access point may broadcast general scan information to any mobile stations within range. The general scan information may be broadcast in packets, frames, or the like.

General scan information broadcasts may include many parameters. For example, general scan information broadcasts may include parameters such as a scan length, a channel scan period, initial channel assignments for each mobile station to scan, and a rule for determining a next channel to scan. Further, an access point may optionally assign the first channel to be scanned by each mobile station. By assigning a first channel to scan, the access point may ensure that each mobile station scans a different channel in each scan period or that all channels are scanned in the least amount of time. In some embodiments, the first channel assignment is not provided, and the mobile station may choose the first channel to be scanned, either randomly or according to a predetermined algorithm.

The channel scan period and the channel scan length may be set to any appropriate values. For example, in some embodiments, the channel scan period may be set to between 10 and 15 seconds, so that mobile stations will perform channel scans every 10 to 15 seconds if the access point does not initiate a channel scan sooner. Also for example, a channel scan length may be set to a few hundred milliseconds. In some embodiments, the channel scan length may be set based in part on the expected interference. For example, a channel scan length may be set to 200 milliseconds in an effort to detect interfering 802.11 networks with a beacon interval of 100 milliseconds. The values for periods and lengths just described are provided as examples only, and the various embodiments are not limited in this regard.

When broadcasting general scan information, the access point may also specify a rule for the mobile stations to determine a next channel to scan. For example, the access point may specify that mobile stations are to increment a channel number after performing a channel scan, and the incremented channel number will specify the next channel to be scanned. In these embodiments, each mobile station scans a sequential block of channels over time. Also, for example, the access point may specify that mobile stations are to compute a next channel to be scanned using a more complex algorithm, such as adding an offset other than one, or looking up a next channel assignment in a table.

In general, the exemplary embodiments provide an efficient distributed operation for choosing RF parameters that are optimal for the network as a whole. While the exemplary embodiments may be used to dynamically configure a variety of different parameters, such as operation channel, transmission power level, and power management modes, an exemplary embodiment for channel configuration is described below.

The ESS (Extended Service Set) mesh network 100 may have five interconnected subsystems as follows: channel scanning subsystem (141), interference detection subsystem (142), leader election subsystem (143), information gathering subsystem (144), and dissemination of the selected configuration subsystem (145).

An ESS mesh network may be a wireless mesh network having several APs and clients. The ESS Mesh network is a next generation wireless network where multiple clients and AP's operate in a multi hop manner to extend wireless range and provide robust connectivity. All APs and clients in an ESS mesh network may operate using the same ESSID (Extended Service Set IDentification) and communicate with each other on the same operating channel, which forms the backbone of the network. With the exemplary embodiments, devices in the ESS mesh network may coordinate with each other to pick an optimal transmission channel for the network backbone. Operation of the embodiments may be dynamic and may adapt to a changing wireless environment.

Figure 2:
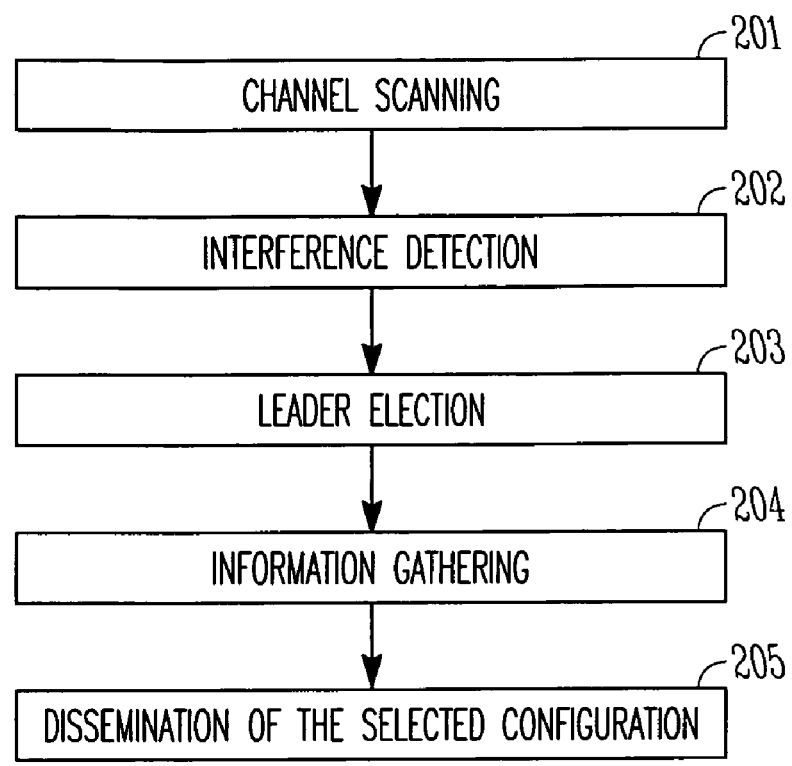
FIG. 2 depicts an exemplary embodiment.

FIG. 2 depicts an exemplary embodiment. This embodiment may basically involve five operations: channel scanning (operation 201), interference detection (operation 202), leader election (operation 203), information gathering (operation 204), and dissemination of the selected configuration (operation 205).

Figure 3:
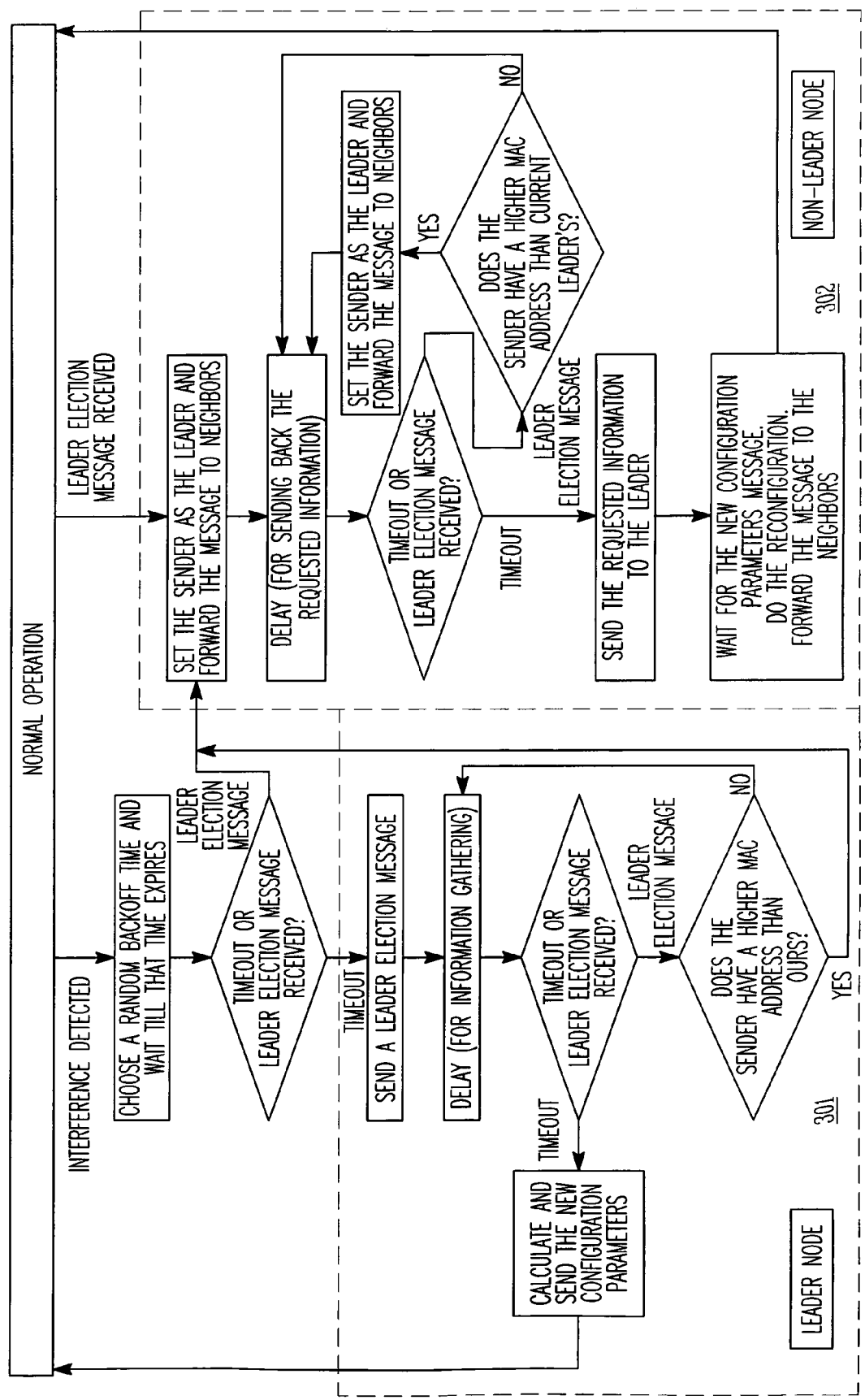
FIG. 3 depicts a more detailed flow diagram of leader election.

FIG. 3 depicts a more detailed flow diagram of leader election. This detailed depiction shows a leader node 301 and a non-leader node 302.

Each of the five operations of channel scanning, interference detection, leader election, information gathering, and dissemination of the selected configuration is described in detail below.

Figure 4:
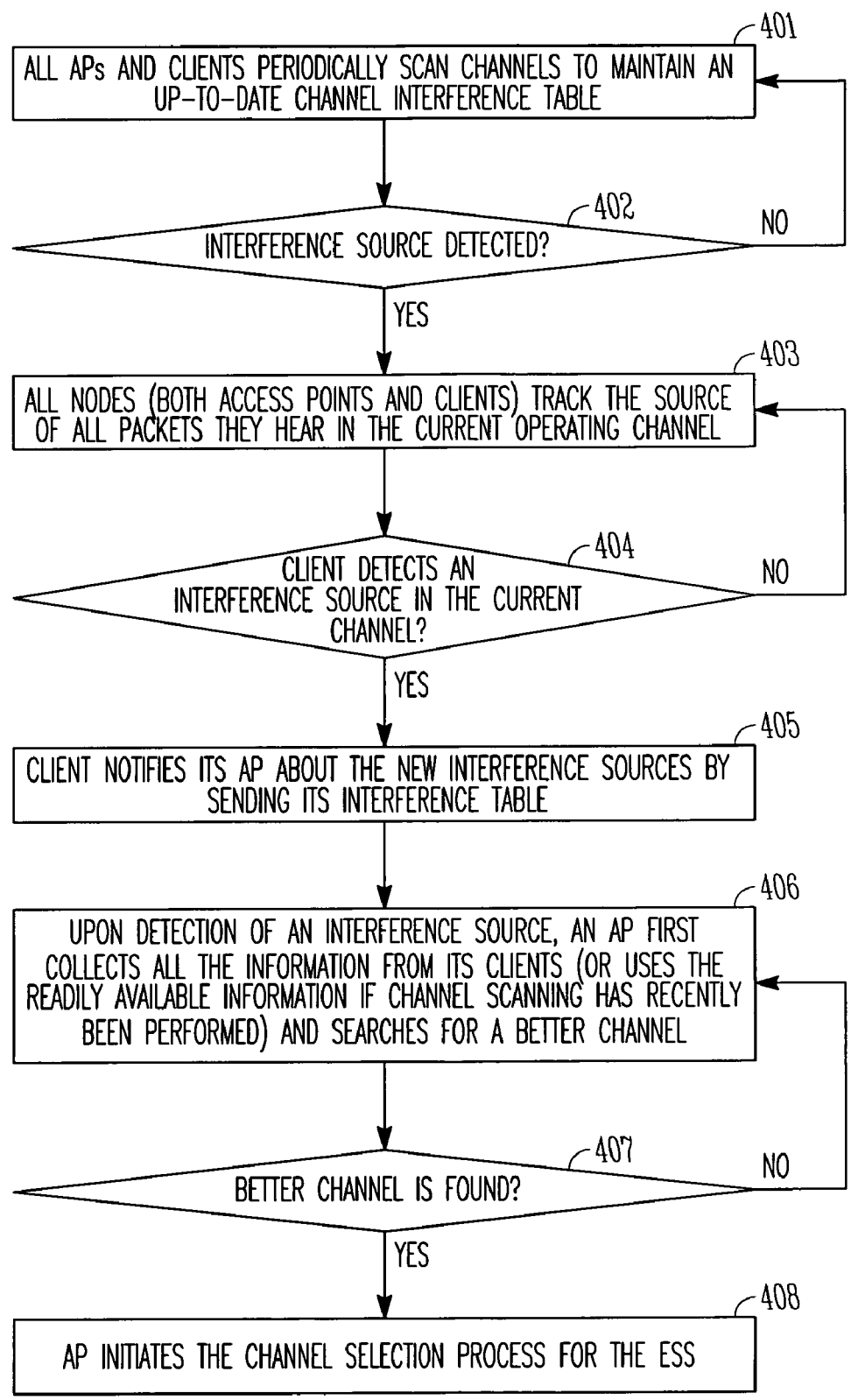
FIG. 4 depicts channel scanning and interference detection.

1. Channel Scanning (FIG. 4)

All APs and clients may periodically scan channels to maintain an up-to-date channel interference table (operation 401). The details of an embodiment of a channel-scanning algorithm are given in copending patent application Ser. No. 10/835,941, filed Apr. 30, 2004.

2. Interference Detection (FIG. 4)

The channel selection process starts when an interference source is detected (operation 402). All nodes (both access points and clients) may track the source of all packets they hear in the current operating channel (operation 403). If a client detects an interference source in the current channel (operation 404), it may notify its AP about the new interference sources by sending its interference table (operation 405). Upon detection of an interference source, an AP may first collect all the information from its clients (or uses the readily available information if channel scanning has recently been performed) and search for a better channel (operation 406). If a better channel is found (operation 407), it may initiate the channel selection process for the ESS (operation 408).

A simple timer mechanism may be used to prevent initiation of the channel selection process over and over when a node may be forced to use a non-optimal channel. Once channel selection is initiated by a node, it sets this timer to a "current time" plus a "minimum time allowed between two channel selections", and does not initiate another channel selection until the timer expires.

Figure 5:
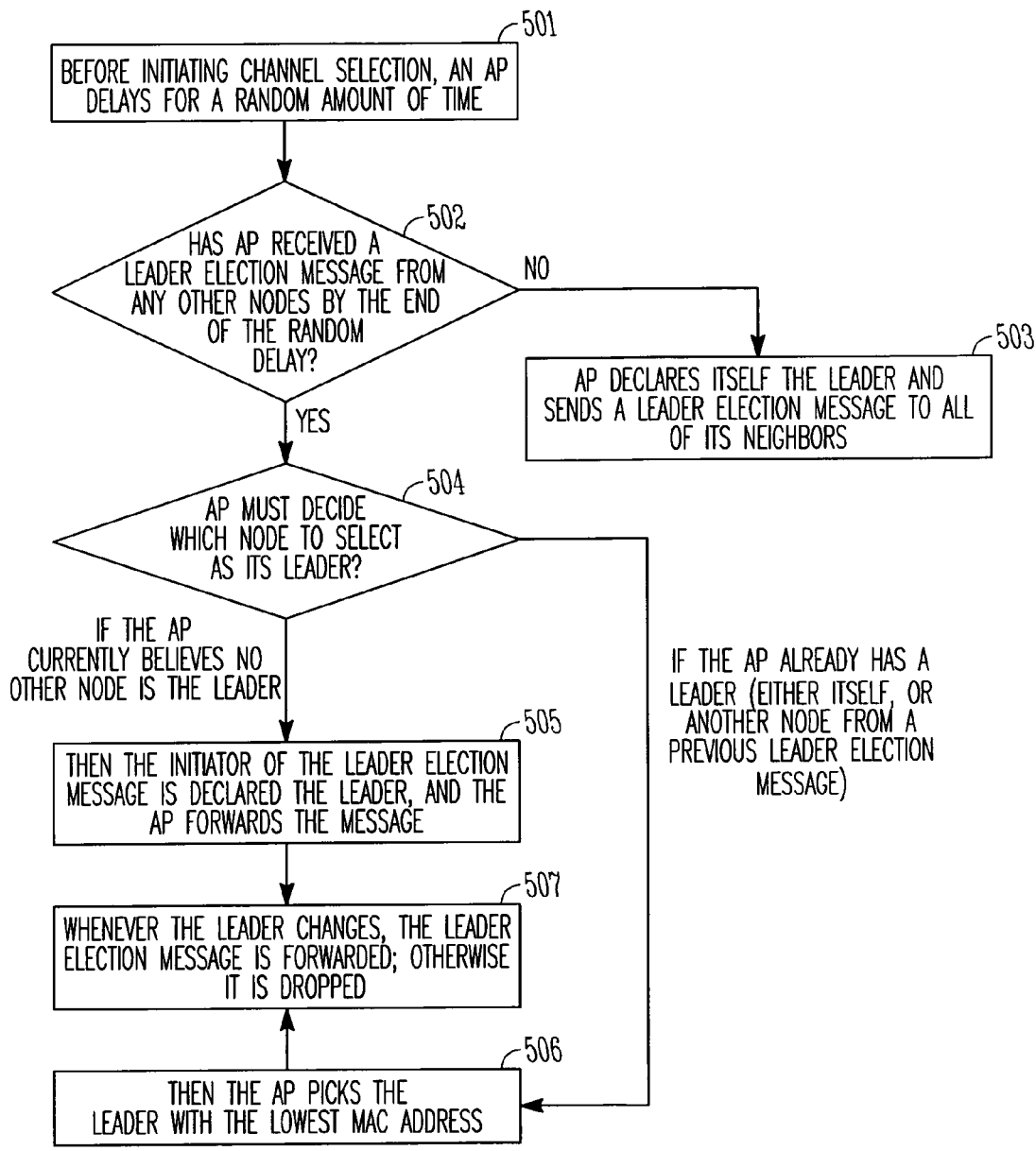
FIG. 5 depicts leader election.

3. Leader Election (FIG. 5)

Before initiating channel selection, an AP may delay for a random amount of time (operation 501). If the AP has not received a leader election message from any other nodes by an end of the random delay (operation 502), it may declare itself the leader and send a leader election message to all of its neighbors (operation 503).

When an AP receives a leader election message, it must decide which node to select as its leader (operation 504). If the AP currently believes no other node is the leader, then an initiator of the leader election message may be declared the leader, and the AP may forward the message (operation 505). If the AP already has a leader (either itself, or another node from a previous leader election message), then it may pick the leader with the lowest MAC (Medium Access Control) address (operation 506). Whenever the leader changes, the leader election message is forwarded; otherwise it is dropped (operation 507). Note that this process will result in the entire network converging on a single leader: the initiator with the lowest MAC address.

When an AP accepts a new leader, in addition to the leader identity, it may also record the identity of a next hop on a path to that leader (the node from which it received the leader election message). In general, frequency hopping utilizes a set of narrow channels and "hops" through all of them in a predetermined sequence. For example, the 2.4 GHz (GigaHertz) frequency band is divided into 70 channels of 1 MHz (MegaHertz) each. Every 20 to 400 msec (millisecond) the system "hops" to a new channel following a predetermined cyclic pattern.

Leader election ends after a pre-determined time period. This time period may be long enough to allow all leader election messages to be disseminated throughout the network. Each node may delay for this set period after the last received leader election message before it considers leader election complete.

Each packet may have a sequence number field that is different than normal MAC layer sequence number. This sequence number may be used to detect duplicate requests that may arrive from different paths. Sequence numbers are used not only in leader election message exchanges, but also for all other related packet exchanges.

Figure 6:
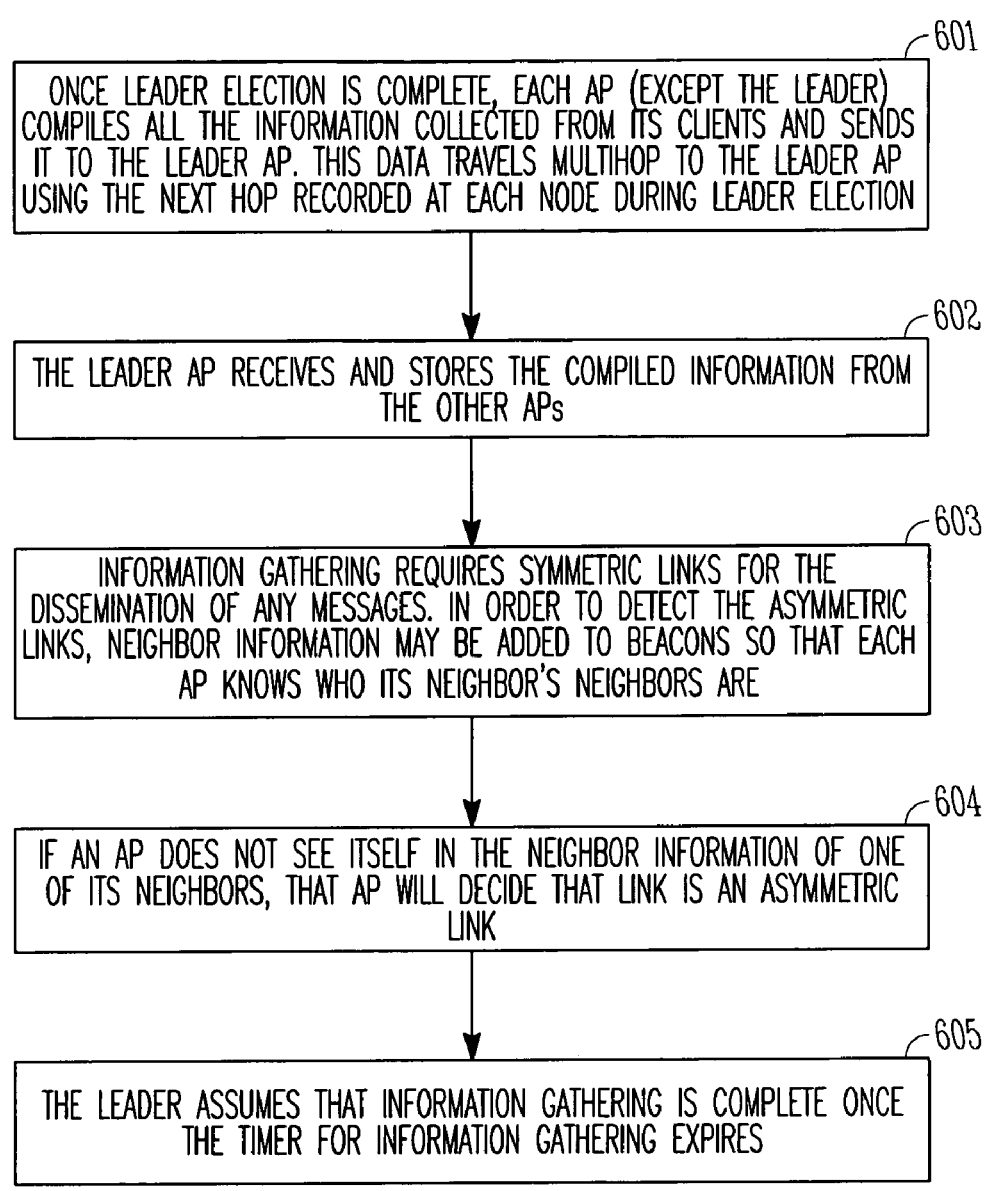
FIG. 6 depicts information gathering.

4. Information Gathering (FIG. 6)

Once leader election is complete, each AP (except the leader) may compile all the information collected from its clients and send it to the leader AP. This compiled information may travel multihop to the leader AP using a next hop recorded at each node during leader election (operation 601). The leader AP receives and may store the compiled information from the other APs (operation 602).

Information gathering may require symmetric links for dissemination of any messages. In order to detect asymmetric links, neighbor information may be added to beacons so that each AP knows who its neighbor's neighbors are (operation 603). If an AP does not see itself in the neighbor information of one of its neighbors, that AP will decide that the link is an asymmetric link (operation 604).

As with leader election, information gathering may complete after a pre-determined delay. The leader assumes that information gathering is complete once the timer expires (operation 605). This time period should be large enough to include time for leader election to complete requests to be processed at each node, and for results from each node to propagate back to the leader AP.

Figure 7:
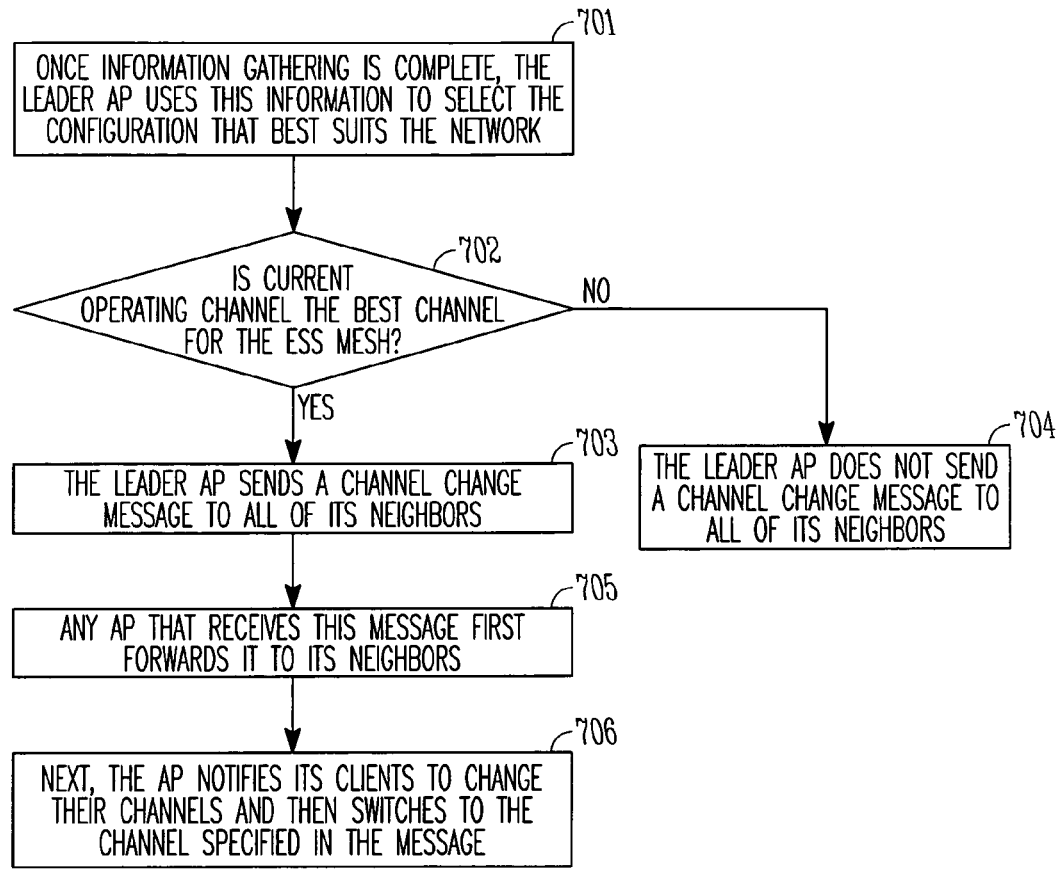
FIG. 7 depicts dissemination of the selected configuration.

5. Dissemination of the Selected Configuration (FIG. 7)

Once information gathering is complete, the leader AP may use this information to select a configuration that best suits the network (operation 701). If a best channel for the ESS mesh network is not a current operating channel (operation 702), the leader AP may send a channel change message to all of its neighbors (operation 703). Otherwise, the leader AP does not send a channel change message to all of its neighbors (operation 704). Any AP that receives this channel change message first forwards it to its neighbors (operation 705). Next, it notifies its clients to change their channels and then switches to the channel specified in the message (operation 706).

Figure 8:
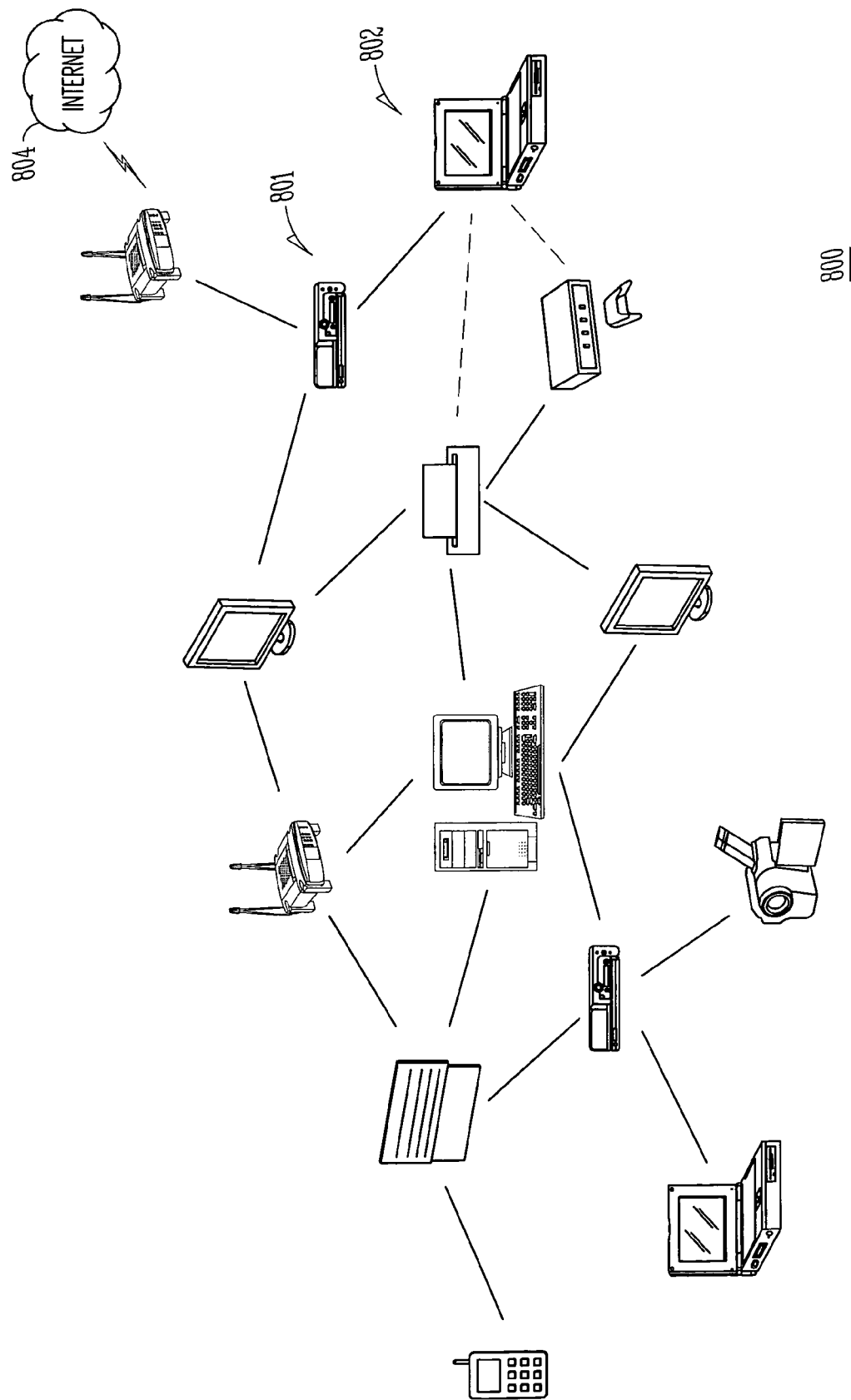
FIG. 8 depicts an example of an ESS mesh network.

FIG. 8 depicts an example of an ESS mesh network 800 in which may be employed the exemplary embodiments described above. In the FIG. 8 embodiment, the ESS mesh network 800 may have a wireless mesh of several access points, such as hub 801, and clients, such as laptop computer 802. As depicted in FIG. 8, the ESS mesh network 800 may be operatively coupled to the Internet 804.

Centralized configuration management requires a special management node to be present in every network. The exemplary embodiments allow a management node to be dynamically elected whenever a configuration change is needed. Thus, no special node is required. The exemplary embodiments are therefore resilient to single points of failure.

Centralized configuration also requires each node to continuously report status information, so that the management node can initiate configuration changes in response to environmental changes. Because the exemplary embodiments allow any node to initiate configuration management in a distributed manner, information need only be shared when changes occur. Thus, the exemplary embodiments have lower information gathering overhead than a completely centralized approach.

Manual configuration of RF parameters depends on the action of a human to react to the changing environment. The exemplary embodiments allow a network to automatically adapt to environmental changes without human intervention.

Device self-configuration and management of radio settings to adapt to dynamic changes in the wireless environment help to improve the performance of the entire network. The use of the exemplary embodiments significantly increases the throughput of each AP and the overall network throughput.

While the operational principles have been described in connection with exemplary embodiments, it is understood that they are not so limited. On the contrary, it is intended to cover all alternatives, modifications and equivalents as may be included within the spirit and scope as defined in the appended claims.

What is claimed is:

1. A method comprising:
   communicating, by a first access point (AP) node, with selected ones of a plurality of nodes in a wireless network, including client nodes and other AP nodes, wherein the plurality of nodes self-configure a channel for communication among the nodes;
   receiving, by the first AP node, information from a client node about an interference source detected by the client node in a current operating channel by tracking a source of packets in the operating channel;
   initiating, by the first AP node, a channel-selection process;
   sending, by the first AP node, a leader election message to a first neighbor node;
   receiving, by the first neighbor node, the leader election message; and
   deciding, by the first neighbor node, whether to accept the sending node as leader;
   if so, the first neighbor node not forward the leader election message;
   if not, the first neighbor picking a leader with a lowest medium access control address, and the first neighbor node forwarding the leader election message to its neighbor nodes.

2. The method of claim 1, wherein selected nodes, including at least one client node, perform channel-scanning to maintain a channel interference table on the selected nodes.

3. The method of claim 1, further comprising:
   after initiating the channel-selection process, setting a timer; and
   the node not initiating another channel selection process until the timer expires.

4. The method of claim 1, further comprising:
before initiating the channel-selection process, setting a timer; and
when the timer expires, if a second neighbor node has not received a leader election message, the second neighbor node declaring itself leader.

5. The method of claim 1, further comprising:
choosing a leader node from the plurality of nodes.

6. The method of claim 5, further comprising:
each node sending channel interference information to the leader node.

7. The method of claim 6, wherein the channel interference information comprises at least one of a scan length parameter, a channel scan period parameter, initial channel assignment parameters, and a rule parameter for determining a next channel to scan.

8. The method of claim 6, further comprising:
terminating the sending of information upon expiration of a timer.

9. The method of claim 6, further comprising:
using, by the leader node, the channel interference information to select an optimum channel.

10. The method of claim 9, further comprising:
if the optimum channel is not the current channel, the leader node sending a channel change message to its neighbor nodes.

11. The method of claim 10, further comprising:
any neighbor node receiving a channel change message forwarding it to its neighbor nodes.

12. The method of claim 10, further comprising:
any neighbor node receiving a channel change message notifying one or more client nodes to change to a new channel; and
the neighbor node subsequently changing to the new channel.

13. The method of claim 9, further comprising:
if the optimum channel is the current channel, the leader node not sending a channel change message to its neighbor nodes.

14. A method, comprising:
periodically scanning, by at least one access point (AP), channels to detect an interference source and to maintain a channel interference table, the at least one AP communicating with selected ones of a network of clients and other APs;
detecting an interference source by the at least one AP tracking a source of packets in an operating channel, wherein, upon detection of the interference source, the at least one AP collects information from selected clients and searches for a better channel, and wherein the at least one AP initiates a channel selection process for the network when a better channel is found;
the at least one AP being elected a leader AP by the network;
the leader AP receiving channel interference information from other APs, wherein the channel interference information is gathered from respective clients of the other APs;
selecting, by the leader AP, an optimal radio frequency parameter using the information received by the leader AP, wherein the optimal radio frequency parameter is at least a configuration parameter that is representative of an optimal configuration for the network; and
disseminating, by the leader AP, the optimal radio frequency parameter to its neighbors in the network.

15. The method according to claim 14, wherein, once channel selection process is initiated by the at least one AP, the at least one AP sets a timer to a current time plus a minimum time allowed between two channel selection processes and does not initiate another channel selection process until the timer expires.

16. The method according to claim 14, wherein, when a respective AP receives a leader election message, if the respective AP currently believes no other node is a leader AP, then an initiator of the leader election message is declared the leader AP, and the respective AP forwards the leader election message, and if the respective AP already has a leader AP, then the respective AP picks, as the leader AP, an AP with a lowest medium access control address.

17. Apparatus, comprising:
a channel-scanning subsystem structured to periodically scan channels in a wireless network of nodes, wherein the network comprises a plurality of access points (APs) and clients, and wherein the apparatus is structured to communicate with the plurality of APs and clients;
an interference detection subsystem structured to detect an interference source by tracking a source of packets in an operating channel, to search for a better channel, and to initiate a channel selection process for the network when a better channel is found;
a timer, to be set upon initiation of the channel selection process, and to prevent initiation of a channel selection process until the timer expires;
a leader election subsystem structured to elect a leader AP from the plurality of APs;
an information gathering subsystem structured to gather, upon detection of an interference source, channel interference information from selected ones of the plurality of clients, and to send the channel interference information to the leader AP;
a dissemination subsystem structured to receive from the leader AP an optimal configuration selected by the leader AP using the channel interference information received by the leader AP, and to disseminate the selected configuration to the plurality of APs; and
wherein the channel-scanning subsystem, the interference detection subsystem, the timer, the leader election subsystem, the information gathering subsystem, and the dissemination subsystem are operatively coupled to one another.

18. The apparatus according to claim 17, wherein, once a channel selection process is initiated, the apparatus sets the timer to a current time plus a minimum time allowed between two channel selections and does not initiate another channel selection until the timer expires.

19. The apparatus according to claim 17, wherein, before initiating a channel selection process, the apparatus delays for a random amount of time; and
wherein if the apparatus has not received a leader election message by an end of the random amount of time, the apparatus declares itself leader AP and sends a leader election message to its neighboring APs.

20. The apparatus according to claim 17, wherein, when the apparatus receives a leader election message, if the apparatus currently believes no other node is a leader AP, then an initiator of the leader election message is declared the leader AP, and the apparatus forwards the leader election message, and if the apparatus already has a leader AP, then the apparatus picks, as the leader AP, an AP with a lowest medium access control address.

21. The apparatus according to claim 17, wherein, once information gathering is complete, the apparatus uses the channel interference information to select an optimum channel for the network;

wherein if the optimum channel for the network is not a current operating channel, the apparatus sends a channel change message to its neighbors; and wherein any AP that receives the channel change message first forwards the channel change message to its neighboring APs, next notifies selected ones of the plurality of clients to change their channels, and then switches to a channel specified in the channel change message.

22. A computer-readable medium having program instructions stored thereon, when executed by a digital processing device, performing the following operations:

periodically scanning, by at least one access point (AP), channels to detect an interference source and to maintain a channel interference table, the at least one AP communicating with selected ones of a network of clients and other APs;

detecting an interference source by the at least one AP tracking a source of packets in an operating channel, wherein, upon detection of the interference source, the at least one AP receives a channel interference table from each of selected clients and searches for a better channel, and wherein the at least one AP initiates a channel selection process for the network when a better channel is found;

the at least one AP being elected a leader AP by the network;

the leader AP receiving channel interference information from other APs, wherein the channel interference information is gathered from respective clients of the other APs;

selecting, by the leader AP, an optimal radio frequency parameter using the information received by the leader AP, wherein the optimal radio frequency parameter is at least a configuration parameter that is representative of an optimal configuration for the network; and disseminating, by the leader AP, the optimal radio frequency parameter to its neighbors in the network.

23. The computer-readable medium of claim 22, further comprising, before initiating a channel selection process, the at least one AP delays for a random amount of time; and wherein if the at least one AP has not received a leader election message by an end of the random amount of time, the at least one AP declares itself leader AP and sends a leader election message to its neighboring APs.

24. The computer-readable medium of claim 22, further comprising, when a respective AP receives a leader election message, if the respective AP currently believes no other node is a leader AP, then an initiator of the leader election message is declared the leader AP, and the respective AP forwards the leader election message, and if the respective AP already has a leader AP, then the respective AP picks, as the leader AP, an AP with a lowest medium access control address.

* * * * *

UNITED STATES PATENT AND TRADEMARK OFFICE
CERTIFICATE OF CORRECTION

| | | |
|---|---|---|
| PATENT NO. | : 7,395,064 B2 | Page 1 of 1 |
| APPLICATION NO. | : 10/890950 | |
| DATED | : July 1, 2008 | |
| INVENTOR(S) | : Demirhan et al. | |

It is certified that error appears in the above-identified patent and that said Letters Patent is hereby corrected as shown below:

In column 6, line 54, in Claim 1, delete "forward" and insert -- forwarding --, therefor.

In column 6, line 56, in Claim 1, after "neighbor" insert -- node --.

In column 6, line 66, in Claim 3, before "node not" insert -- first AP --.

In column 6, line 66, in Claim 3, delete "channel selection" and insert -- channel-selection --, therefor.

In column 7, line 18, in Claim 8, delete "of" and insert -- of channel interference --, therefor.

Signed and Sealed this

Twenty-third Day of September, 2008

JON W. DUDAS
*Director of the United States Patent and Trademark Office*